United States Patent
Tieu et al.

(10) Patent No.: US 8,218,870 B2
(45) Date of Patent: Jul. 10, 2012

(54) METHOD FOR SEGMENTING IMAGES WITH INTENSITY-BASED LABEL PROPAGATION AND PROBABILISTIC OF LEVEL SETS

(75) Inventors: Kinh Han Tieu, Boston, MA (US); Yingxuan Zhu, Minoa, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 352 days.

(21) Appl. No.: 12/708,228

(22) Filed: Feb. 18, 2010

(65) Prior Publication Data
US 2011/0200255 A1    Aug. 18, 2011

(51) Int. Cl.
*G06K 9/00* (2006.01)
(52) U.S. Cl. .......................................................... 382/173

(58) Field of Classification Search ................... 382/173
See application file for complete search history.

(56) References Cited

U.S. PATENT DOCUMENTS

| | | | | |
|---|---|---|---|---|
| 6,021,213 | A  * | 2/2000 | Helterbrand et al. | 382/128 |
| 6,072,889 | A  * | 6/2000 | Deaett et al. | 382/103 |
| 7,050,646 | B2 * | 5/2006 | Xu et al. | 382/254 |
| 7,277,582 | B2 | 10/2007 | Paragios | |
| 8,094,936 | B2 * | 1/2012 | Woo et al. | 382/173 |
| 2009/0196349 | A1 * | 8/2009 | Park et al. | 375/240.12 |

* cited by examiner

*Primary Examiner* — Vikkram Bali
(74) *Attorney, Agent, or Firm* — Dirk Brinkman; Gene Vinokur

(57) ABSTRACT

A method exploits user labels in image segmentation. The user labels are propagated with respect to image intensity information. Propagated user labels are included in a cost function of level set evolution. The level set represents a probability of the object segment.

10 Claims, 6 Drawing Sheets

300

METHOD FOR SEGMENTING IMAGES WITH INTENSITY-BASED LABEL PROPAGATION AND PROBABILISTIC OF LEVEL SETS

FIELD OF THE INVENTION

This invention relates generally to image processing, and more particularly to image segmentation.

BACKGROUND OF THE INVENTION

Conventional image processing can use a level set and user information to segment an image, e.g., see U.S. Pat. No. 7,277,582, "User interactive level set methods for image segmentation." The level set is evolved to minimize a cost function, wherein variances of image intensities object pixels and background pixels are used in cost function. The user can label pixels as object or background pixels and penalize deviations of the sign of the evolving level set from the sign of the user-labeled pixels, and nearby pixels with an isotropic weighting, i.e., the weighting is uniform in all directions.

However, conventionally, the user labels do not incorporate image intensity information. The variance terms in the level set evolution dominate and only pixels near user selected background locations remain as background.

FIG. 1 shows an image that has a failure of the segmentation with conventional user interaction. The correct segmentation shown in FIG. 2 is difficult to achieve.

It is an object of the invention to produce a segmentation that approximated the correct segmentation.

SUMMARY OF THE INVENTION

The embodiments of the invention provide a method for segmenting an input image using level sets and user labels. The method propagates the labels based on image intensity information, and combines the information with a probabilistic level set representation. The method improves increases accuracy, while reducing processing time.

DETAILED DESCRIPTION OF THE PREFERRED EMBODIMENTS

Figure 3:
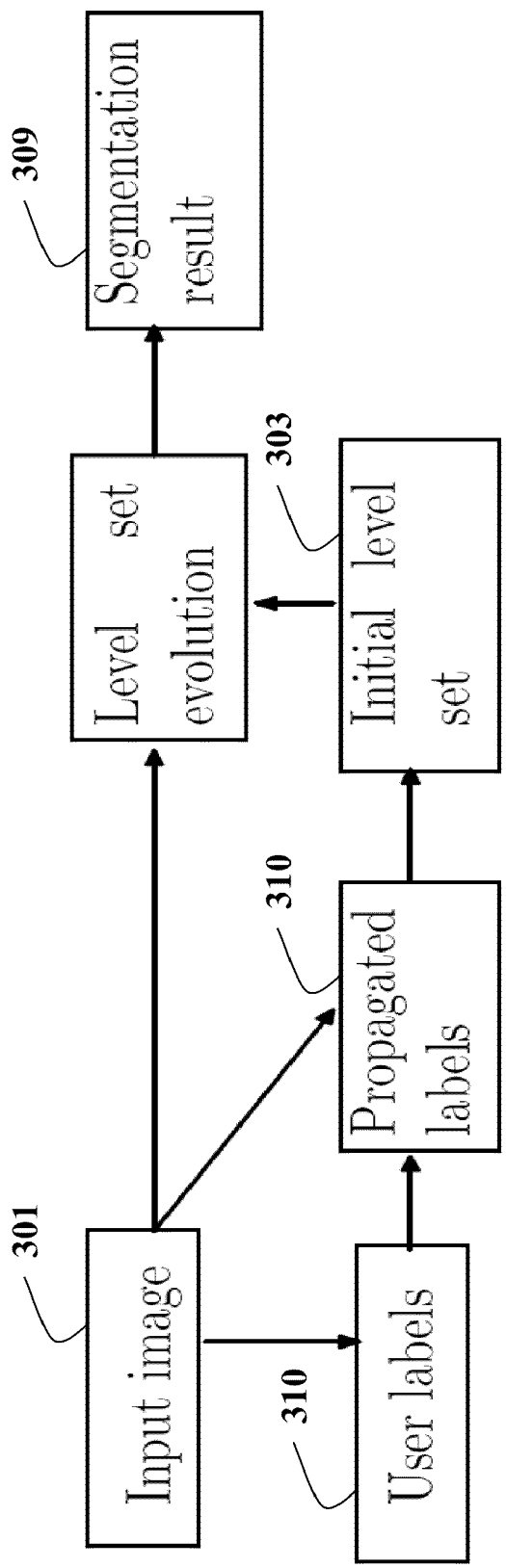
FIG. 3 is a block diagram of a method for segmenting an image according to embodiments of the invention.
Figure 6:
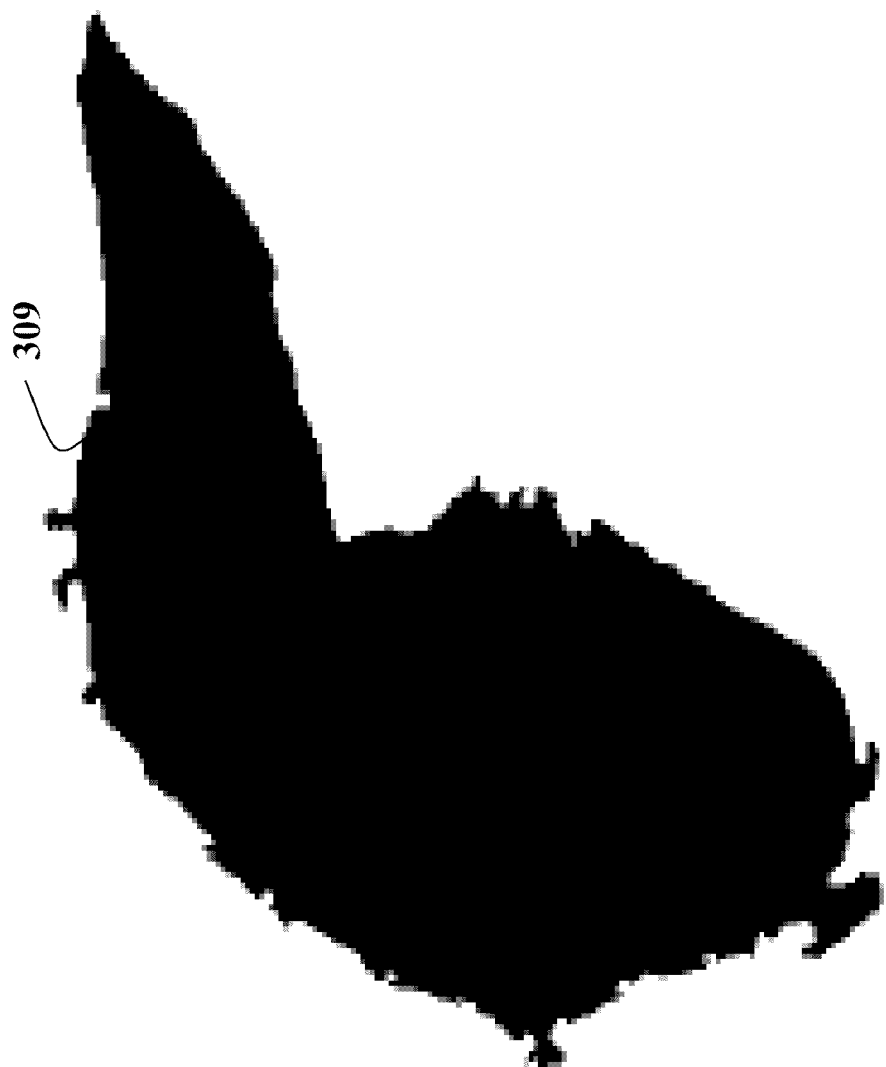
FIG. 6 is an image of a segment according to embodiments of the invention.

FIG. 3 shows a method 300 for segmenting an input image 301 according to embodiments of our invention to produces a segment 309 in an output image 309, see FIG. 6. The steps of the method can be performed in a processor including memory and input/output interfaces connected by a bus as known in the art.

Figure 4:
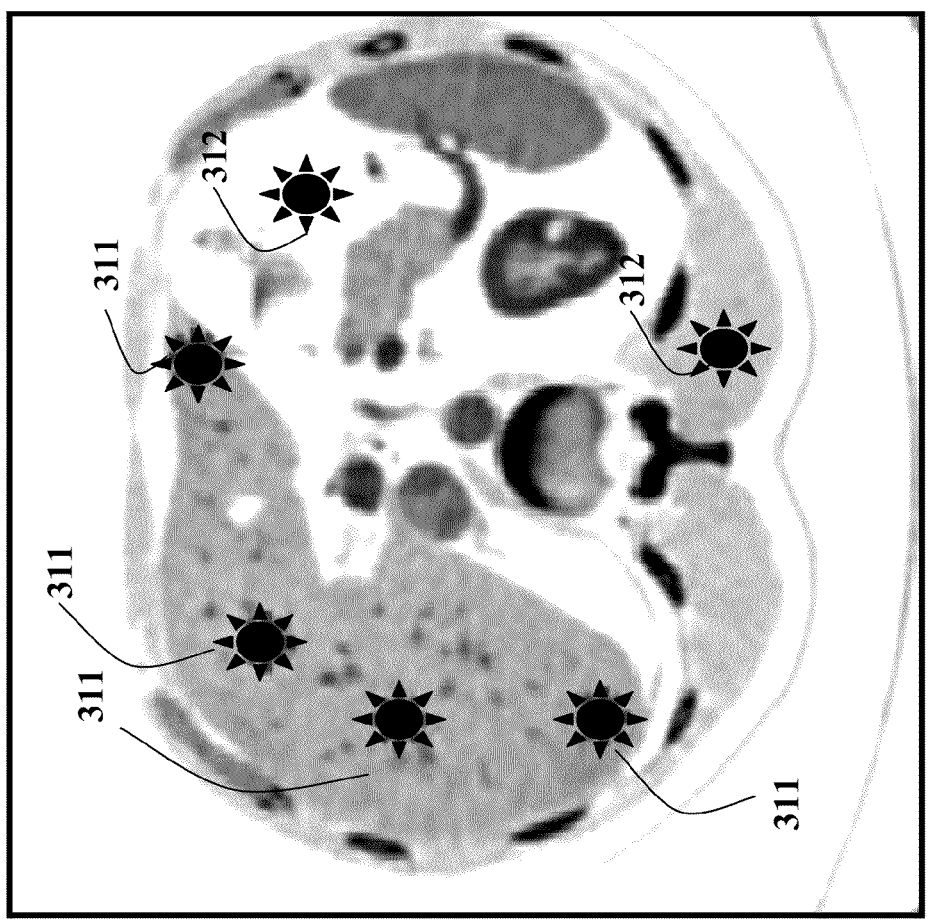
FIG. 4 is an image with labeled pixels according to embodiments of the invention.

A user supplies a set of labels 310. The set of labels identifies object pixels 311 and background pixels 312, see FIG. 4. The labels are propagated 310 to produce an initial level set 303. Then, the level set is evolved, using a cost function J described in detail below, to produce a segment 309 in and output image.

The level set represents the segmentation of the input image in a spatial domain with functions $\Omega_1$, $\Omega_2$ and C, where $$\Omega_1 = \{(x,y): f(x,y) > 0\},$$

$$\Omega_2 = \{(x,y): f(x,y) < 0\},$$

$$C = \{(x,y): f(x,y) = 0\},$$

where the function $\Omega_1$ identifies a background region of the object pixels, the function $\Omega_2$ identifies a background region of the background pixels, and the function C identifies boundary pixels between the object and the background regions, and (x, y) are coordinates of locations of the pixels in the input image.

A region-based level set cost function $J_o$ of the cost function J is $$J_0 = \sum_{i=1}^{2} \int_{\Omega} (u(x, y) - \bar{u}_i)^2 \chi_i(f(x, y)) dx dy, \quad (4)$$

where u is an intensity of the pixel at image location (x, y), and $$\bar{u}_i = \frac{\int_{\Omega} u(x, y) \chi_i(f(x, y)) dx dy}{\int_{\Omega} \chi_i(f(x, y)) dx dy}, \quad (5)$$

are means of the pixel intensities of each region, and $$\chi_1(z) = H(z), \chi_2(z) = 1 - H(z), \quad (6)$$

where $$H(z) = \begin{cases} 0 & \text{if } z < 0 \\ 1 & \text{if } z \geq 0, \end{cases} \quad (7)$$

is a Heaviside step function. The Heaviside step function H, also called a unit step function, is a discontinuous function whose value is zero for negative argument, and one for positive arguments.

Our cost function J also includes a user label cost function $J_U$ and a maximum belief cost function $J_B$ as described below.

The set of user labels is encoded using a function $$L(x, y) = \begin{cases} 1 & \text{if the pixel at the location } (x, y) \\ & \text{is one of the object pixels,} \\ 0 & \text{if the pixel at the location } (x, y) \\ & \text{is one of the background pixels, and} \\ 0.5 & \text{otherwise.} \end{cases} \quad (8)$$

Figure 5:
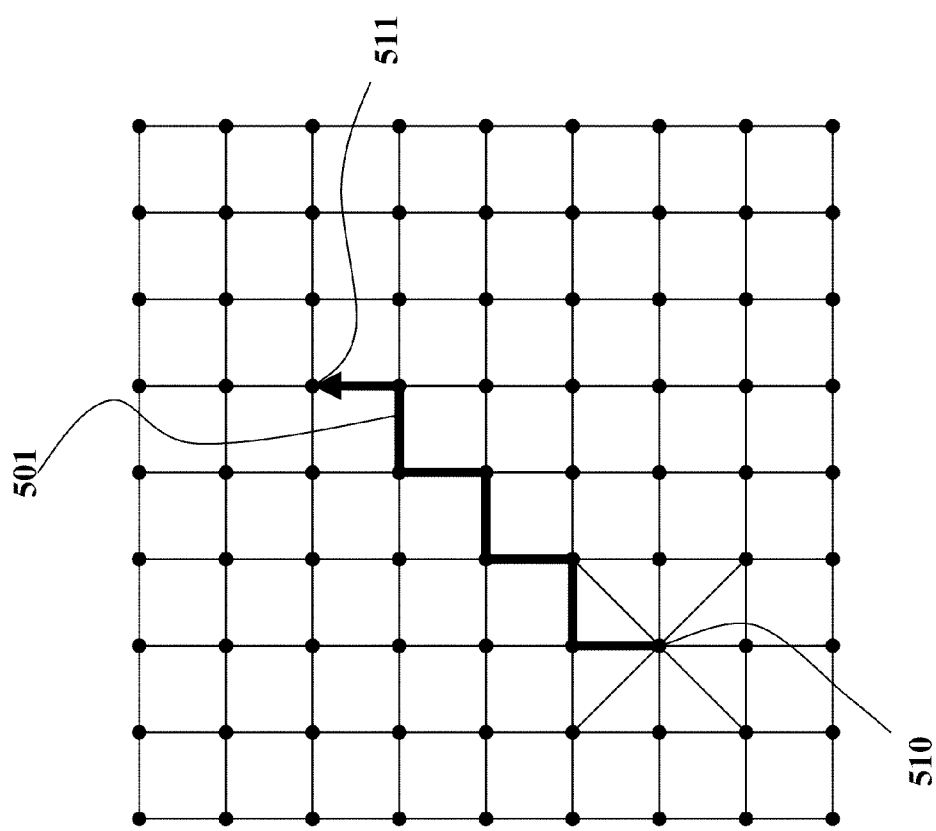
FIG. 5 is a schematic of an image grid graph according to embodiments of the invention.

As shown in FIG. 5, the label propagation 310 determines a minimum distance D along a path 501 in an image grid graph from each unlabeled pixel 510 to one of the labeled pixel 511. In the image grid graph, each pixel is a node and edges connect each node with eight nearest neighboring pixels as shown only for pixel 510.

The minimum distance is $$D_k(x, y) = \min_{(x_1,y_1),(x_2,y_2),\ldots,(x_m,y_m)} \sum_{i=1}^{m} d((x_{i-1}, y_{i-1}), (x_i, y_i)), \quad (9)$$

where $L(x_m, y_m)=k$, for $k=0, 1$, and where m is an index of the pixel $(x_m, y_m)$.

That is, $D_0(x, y)$ is the minimum distance from the unlabeled pixel at location $(x, y)$ to one of the labeled pixels that is similar in intensity. The corresponding path is $$(x, y),(x_1, y_1), (x_2, y_2), \ldots, (x_m, y_m),$$

where $L(x_m, y_m)=0$. The index m changes for every pixel location $(x, y)$.

In other words, unlabeled pixels at different locations have different paths to one of the labeled pixel, and hence different path lengths m.

$$d((X_{i-1}, Y_{i-1}),(X_i, Y_i))=\|U(X_{i-1}, Y_{i-1})-U(X_i, Y_i)\| \quad (10)$$

The minimum distances initialize a probabilistic level set as $$f^0(x, y) = 1 - \frac{D_1(x, y)}{D_1(x, y) + D_0(x, y)}, \text{ and} \quad (11)$$

$$J_U = -\int_\Omega (f(x, y) - f^0(x, y))^2 dx dy. \quad (12)$$

The probabilistic level sets is used in the maximum belief cost function:

$$J_B = \frac{\int_\Omega f(x, y)H(f(x, y))dxdy}{N}, \quad (13)$$

where $$N=\int_\Omega H(f(x, y))dxdy \quad (40)$$

is a number of the object pixels.

Thus, the cost function used during the evolution is the sum of the region-based cost function $J_o$, the user cost function $J_U$, and the maximum belief cost function $J_B$:

$$J=J_O+\lambda_U J_U+\lambda_B J_B \quad (14)$$

where $\lambda_U$ and $\lambda_B$ are scalar parameters to control a relative importance of the user cost function $J_U$ and the maximum belief cost function $J_B$, respectively.

The level set is evolved using Euler-Lagrange equations of the cost function until a local minimum is reached. The EulerLagrange equations are differentiable and stationary at the local minimum.

Figure 1:
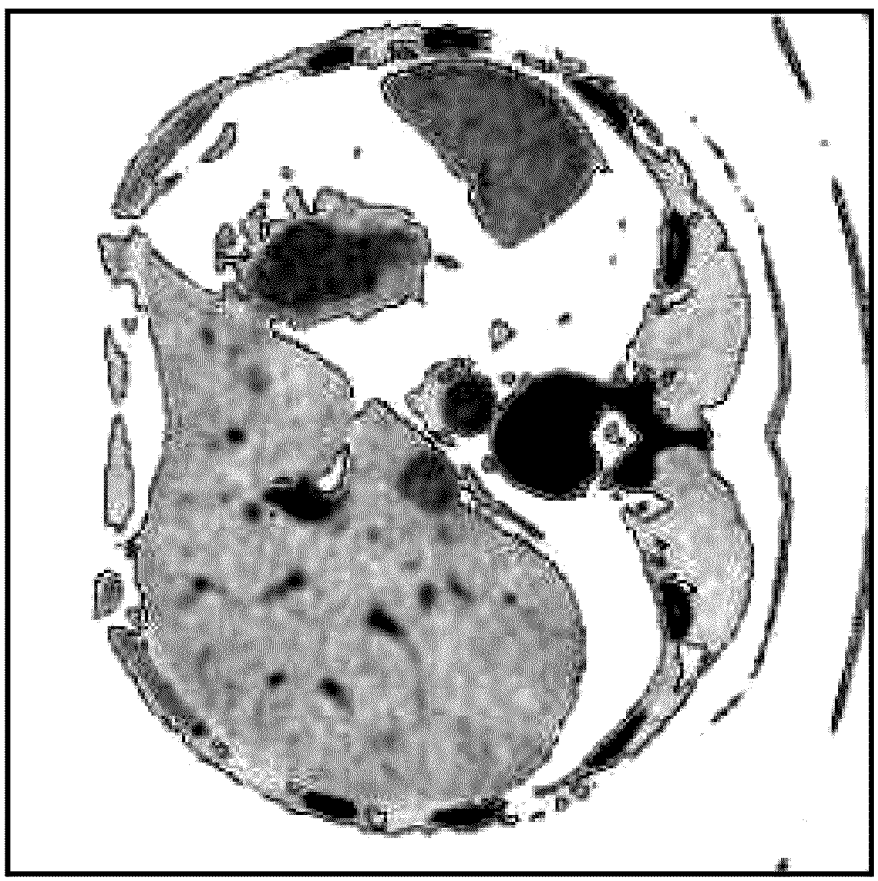
FIG. 1 is an image of a failed segmentation with conventional methods.
Figure 2:
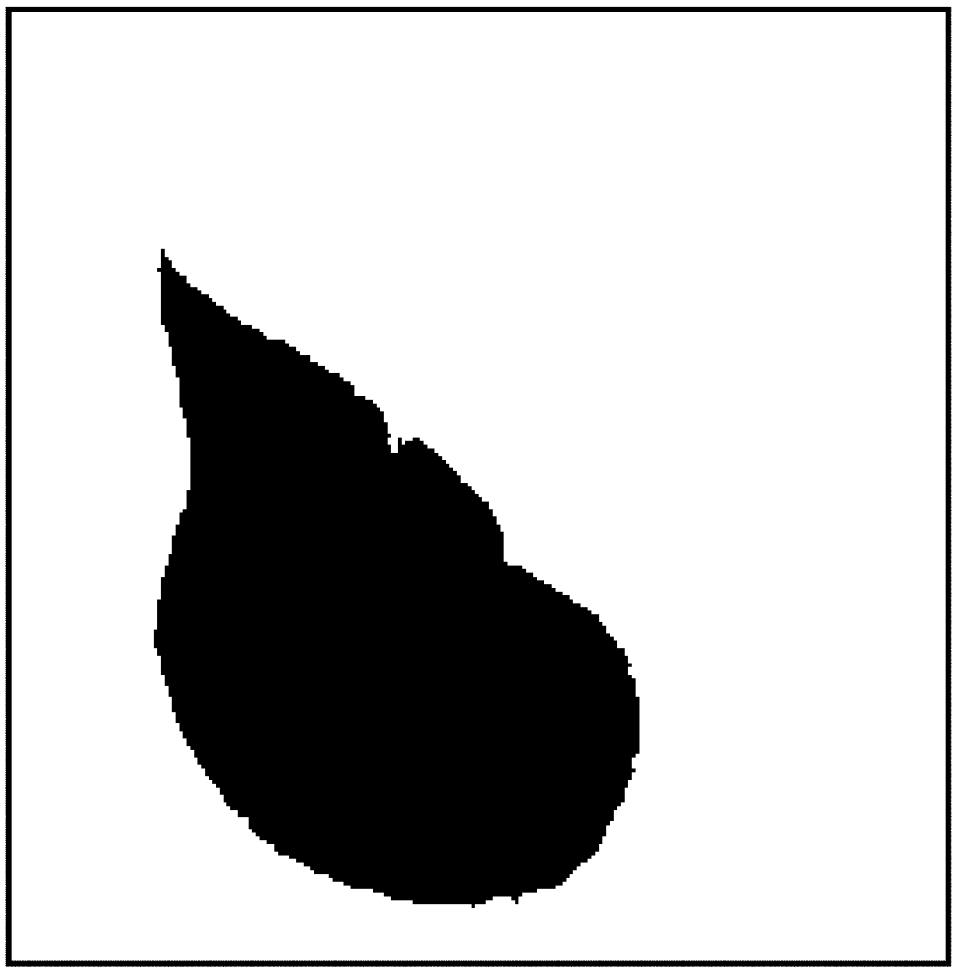
FIG. 2 is the correct segmentation for the image in FIG. 1.

FIG. 6 shows the segment 309 produce by the method described above, which is visible more accurate than the segmentation shown in FIG. 1 with conventional methods.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for segmenting an input image of an object, comprising the steps of:

specifying, by a user, a set of labels for pixels in the input image to produce labeled pixels and remaining unlabeled pixel, wherein the set of labels identifies object pixels and background pixels;

propagating the labels in the input image based on differences of intensities of neighboring pixels to produce an initial level set, wherein the initial level set is represented probabilistically; and evolving the initial level set using a cost function to produce a segment in an output image, and wherein the steps are performed in a processor.

2. The method of claim 1, wherein the level represents a segmentation of the input image in a spatial domain with functions $\Omega_1$, $\Omega_2$ and C, where $$\Omega_1=\{(x,y): f(x,y)>0\},$$

$$\Omega_2=\{(x,y): f(x,y)<0\},$$

$$C=\{(x,y): f(x,y)=0\},$$

and where the function $\Omega_1$ identifies a object region of the object pixels, the function $\Omega 2$ identifies a background region of the background pixel, and the function C identifies boundary pixels between the object regions and the background region, and $(x, y)$ are coordinates of locations of the pixels in the input image.

3. The method of claim 1, wherein the cost function includes a region-based level set cost function $J_o$, a user label cost function $J_U$, and a maximum belief cost function $J_B$.

4. The method of claim 3, wherein the region-based cost function is $$J_0 = \sum_{i=1}^{2} \int_\Omega (u(x, y) - \bar{u}_i)^2 \chi_i(f(x, y))dxdy,$$

where u is the intensity of the pixel at the location $(x, y)$, and $$\bar{u}_i = \frac{\int_\Omega u(x, y)\chi_i(f(x, y))dxdy}{\int_\Omega \chi_i(f(x, y))dxdy}, \quad (5)$$

are means of the pixel intensities in a particular region, and $$\chi_1(z) = H(z), \chi_2(z) = 1 - H(z),$$

where $$H(z) = \begin{cases} 0 & \text{if } z < 0 \\ 1 & \text{if } z \geq 0 \end{cases}$$

is a Heaviside step function.

5. The method of claim 4, where the set of user labels is encoded using a function $$L(x, y) = \begin{cases} 1 & \text{if the pixel at the location } (x, y) \\ & \text{is one of the object pixels,} \\ 0 & \text{if the pixel at the location } (x, y) \\ & \text{is one of the background pixels, and} \\ 0.5 & \text{otherwise.} \end{cases}$$

6. The method of claim 5, wherein the propagating determines a minimum distance D along a path in an image grid graph from each unlabeled pixel to one of the labeled pixel, wherein the minimum distance is $$D_k(x, y) = \min_{(x_1, y_1), (x_2, y_2), \ldots, (x_m, y_m)} \sum_{i=1}^{m} d((x_{i-1}, y_{i-1}), (x_i, y_i)), \quad (9)$$

where $L(X_m, Y_m) = k$, for $k = 0, 1$, and m is an index of the pixel $(X_m, Y_m)$.

7. The method of claim 6, wherein the minimum distances initialize a probabilistic level set as $$f^0(x, y) = 1 - \frac{D_1(x, y)}{D_1(x, y) + D_0(x, y)}, \text{ and}$$

-continued
$$J_U = -\int_\Omega (f(x, y) - f^0(x, y))^2 dx dy.$$

8. The method of claim 7, wherein the probabilistic level sets is used in the maximum belief cost function:

$$J_B = \frac{\int_\Omega f(x, y) H(f(x, y)) dx dy}{N},$$

where $N = \int_\Omega H(f(x,y)) dx dy$ is a number of the object pixels.

9. The method of claim 1, wherein the cost function is $$J = J_O + \lambda_U J_U + \lambda_B J_B \quad (14)$$

where $\lambda_U$ and $\lambda_B$ are scalar parameters to control a relative importance of the user cost function $J_U$ and the maximum belief cost function $J_B$, respectively.

10. The method of claim 1, wherein the evolving uses Euler-Lagrange equations of the cost function until a local minimum is reached.

* * * * *